United States Patent
Ye et al.

(10) Patent No.: US 11,614,931 B2
(45) Date of Patent: Mar. 28, 2023

(54) ONLINE SOFTWARE UPGRADE DEVICE AND METHOD FOR MAINTAINING OPERATION UNINTERRUPTED

(71) Applicant: Global Technology Inc., Ningbo (CN)

(72) Inventors: Xiai Ye, Ningbo (CN); Yuenan Chen, Ningbo (CN); Zhiwei Yin, Ningbo (CN)

(73) Assignee: Global Technology Inc., Ningbo (CN)

( * ) Notice: Subject to any disclaimer, the term of this patent is extended or adjusted under 35 U.S.C. 154(b) by 33 days.

(21) Appl. No.: 17/495,958

(22) Filed: Oct. 7, 2021

(65) Prior Publication Data
US 2022/0405079 A1 Dec. 22, 2022

(30) Foreign Application Priority Data
Jun. 18, 2021 (CN) .......................... 202110676891.2

(51) Int. Cl.
G06F 9/445 (2018.01)
G06F 8/65 (2018.01)
G06F 1/26 (2006.01)

(52) U.S. Cl.
CPC . *G06F 8/65* (2013.01); *G06F 1/26* (2013.01)

(58) Field of Classification Search
CPC ...................................... G06F 8/65; G06F 1/26
USPC ......................................................... 717/168
See application file for complete search history.

(56) References Cited

U.S. PATENT DOCUMENTS

| | | | |
|---|---|---|---|
| 5,632,039 A * | 5/1997 | Walker | G06F 1/26 713/300 |
| 7,058,484 B1 * | 6/2006 | Potega | H02J 7/00047 700/297 |
| 2020/0065280 A1 * | 2/2020 | Huang | G06F 13/362 |

* cited by examiner

*Primary Examiner* — Chuck O Kendall
(74) *Attorney, Agent, or Firm* — Grossman Tucker Perreault & Pfleger, PLLC; Norman S. Kinsella

(57) ABSTRACT

An online software upgrade device for maintaining operation uninterrupted is disclosed. One embodiment includes a processing unit having first power and chip enabling pins and a controlling pin, an expansion I/O chip having second power and chip enabling pins and a controlled pin, and a pull-down resistor having a first end connecting with the first and second chip enabling pins. The first power enabling pin outputs a first power enabling signal and connects a power source, the first chip enabling pin outputs a first chip enabling signal and connects a driving pin of a controlled chip, and the controlling pin outputs an operation signal. The second power enabling pin connects with the first power enabling pin and outputs a second power enabling signal, the second chip enabling pin connects the first chip enabling pin and outputs a second chip enabling signal, and the controlled pin connects with the controlling pin.

8 Claims, 5 Drawing Sheets

ONLINE SOFTWARE UPGRADE DEVICE AND METHOD FOR MAINTAINING OPERATION UNINTERRUPTED

CROSS-REFERENCE TO RELATED APPLICATIONS

This non-provisional application claims priority under 35 U.S.C. § 119(a) on Patent Application No(s). 202110676891.2 filed in China on Jun. 18, 2021, the entire contents of which are hereby incorporated by reference.

BACKGROUND

1. Technical Field

This disclosure relates to an online software upgrade device and method, especially to an online software upgrade device and method for maintaining operation uninterrupted.

2. Related Art

With the development of technology, many products are becoming more and more intelligent. The products usually carry a microcontroller unit (MCU) to realize remote monitoring and controlling by, for example, controlling the enabling pin, reset pin and power switch of an external chip in order to enable/facilitate the operation of a product. In the actual application, when the manufacturer needs to add new functions or modify certain functions of the product as well as fix some problems, the software modification and upgrade become necessary. However, for example, when the MCU performs software upgrade and switches to a new software, the reset pin of the MCU causes the electrical level of the pin (for example, the enabling pin, reset pin and power switch of an external chip) to reset, thereby interrupting the operation of the chips electrically connected to the MCU. Therefore, the operation of the product might discontinue, which remains a lot to be desired in various aspects.

SUMMARY

Accordingly, this disclosure provides an online software upgrade device and method for keeping operation uninterrupted.

According to one or more embodiment of this disclosure, an online software upgrade device for maintaining operation uninterrupted includes a processing unit having a first power enabling pin, a first chip enabling pin and a controlling pin, with the first power enabling pin configured to output a first power enabling signal, the first chip enabling pin configured to output a first chip enabling signal, and the controlling pin configured to output an operation signal. The first chip enabling pin is configured to electrically connect with a driving pin of a controlled chip, and the first power enabling pin is configured to electrically connect with a power source supplying power to the controlled chip. The disclosed device further includes an expansion input/output (I/O) chip having a second power enabling pin, a second chip enabling pin and a controlled pin, with the second power enabling pin electrically connecting with the first power enabling pin and configured to output a second power enabling signal, the second chip enabling pin electrically connecting with the first chip enabling pin and configured to output a second chip enabling signal, and the controlled pin electrically connecting with the controlling pin to receive the operation signal. The disclosed upgrade device also includes a pull-down resistor having a first end electrically connecting with the first chip enabling pin and the second chip enabling pin, and the pull-down resistor further having a second end being grounded.

According to one or more embodiment of this disclosure, an online software upgrade device for maintaining operation uninterrupted includes a processing unit having a first power enabling pin, a first chip enabling pin and a controlling pin, with the first power enabling pin configured to output a first power enabling signal, the first chip enabling pin configured to output a first chip enabling signal, and the controlling pin configured to output an operation signal. The first chip enabling pin is configured to electrically connect with a driving pin of a controlled chip, and the first power enabling pin is configured to electrically connect with a power source supplying power to the controlled chip. The disclosed upgrade device further includes an expansion input/output chip having a second power enabling pin and a controlled pin, with the second power enabling pin electrically connecting with the first power enabling pin and configured to output a second power enabling signal, and the controlled pin electrically connecting with the controlling pin to receive the operation signal. Additionally, the disclosed upgrade device includes a pull-up resistor having a first end electrically connecting with the first chip enabling pin, and the pull-up resistor further having a second end being grounded.

In view of the above description, in an embodiment of the present disclosure, the expansion I/O chip receiving the operation signal may at least output the power enabling signal or even output the chip enabling signal for the controlled chip to operate normally when the processing unit stops outputting the power enabling signal and the chip enabling signal due to the firmware update. With the online software upgrade method for maintaining operation uninterrupted of the present disclosure, the operation (for example, communication operation) of the chip may be uninterrupted (for example, avoiding the upload or download of important data being interrupted, or avoiding the delay of displayed images, etc.) even when a user upgrades the software of the device at the same time.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
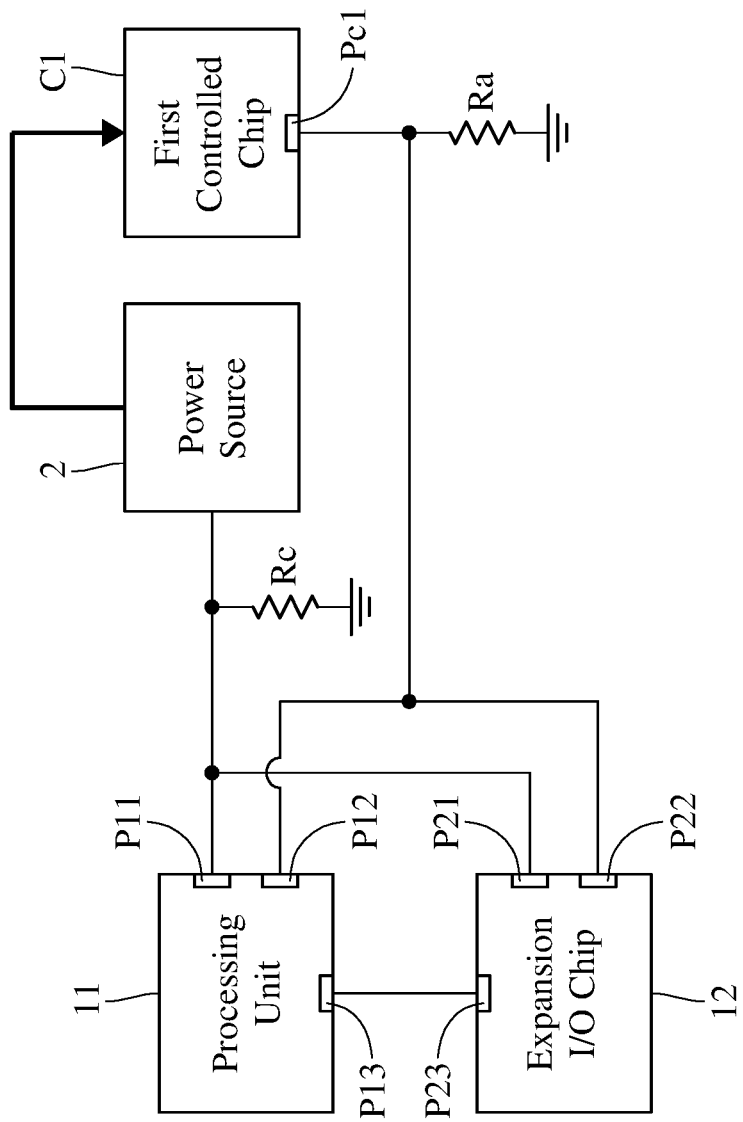
FIG. 1 is a block diagram of an online software upgrade device for keeping operation uninterrupted of a first embodiment of the present disclosure.

Please refer to FIG. 1, the online software upgrade device for maintaining operation uninterrupted of a first embodiment of the present disclosure may include a processing unit 11, an expansion input/output (I/O) chip 12 and a pull-down resistor Ra. FIG. 1 further illustrates a power source 2 and a first controlled chip C1. The processing unit 11 has a first power enabling pin P11, a first chip enabling pin P12 and a controlling pin P13. The first power enabling pin P11 is configured to output a first power enabling signal, the first chip enabling pin P12 is configured to output a first chip enabling signal, and the controlling pin P13 is configured to output an operation signal. The first chip enabling pin P12 is configured to electrically connect with a driving pin Pc1 of the first controlled chip C1, and the first power enabling pin P11 is configured to electrically connect with the power source 2 supplying power to the first controlled chip C1. The expansion I/O chip 12 has a second power enabling pin P21, a second chip enabling pin P22 and a controlled pin P23. The second power enabling pin P21 electrically connects with the first power enabling pin P11 and is configured to output a second power enabling signal, the second chip enabling pin P22 electrically connects with the first chip enabling pin P12 and is configured to output a second chip enabling signal, and the controlled pin P23 electrically connects with the controlling pin P13 to receive the operation signal. In the first embodiment of the present disclosure, the controlled pin P23 and the controlling pin P13 may electrically connect with each other through an inter integrated circuit (I2C) bus. The following will describe each element in more detail.

The processing unit 11 in an embodiment of the present application may be, for example, a microcontroller unit (MCU). In the first embodiment of the present disclosure, the processing unit 11 may respectively send the first power enabling signal to the power source 2 through the first power enabling pin P11 and the first chip enabling signal to the first controlled chip C1 through the first chip enabling pin P12, for the first controlled chip C1 to operate normally. In this embodiment, the first power enabling signal and the first chip enabling signal outputted by the processing unit 11 are in a high-level state, but the present disclosure is not limited thereto.

Further, the processing unit 11 may be used to perform a firmware update. The firmware update is performed when the firmware of the device needs to be updated to a new version, and is usually performed after a new version of the firmware information is downloaded to initialize the processing unit 11 to activate the new firmware. The processing unit 11 of the first embodiment of the present disclosure may send the operation signal to expansion I/O chip 12 before performing the firmware update, and stop the output of the first power enabling signal and the first chip enabling signal when the firmware update is performed. The processing unit 11 outputs the first chip enabling signal and the first power enabling signal again after the firmware update is completed, and sends another operation signal to the expansion I/O chip 12.

The expansion I/O chip 12 when in a default open-drain state may respectively output the second power enabling signal through the second power enabling pin P21 to the power source 2 and the second chip enabling signal through the second chip enabling pin P22 to the first controlled chip C1 according to the operation signal. In the first embodiment of the present disclosure, the first power enabling signal and the second power enabling signal might have the same electrical signal level, and the first chip enabling signal and the second chip enabling signal might also have the same electrical signal level. In short, combining the operations of the processing unit 11 and the expansion I/O chip 12, the expansion I/O chip 12 may be seen as replacing the processing unit 11 to output the chip enabling and the power enabling signals when the processing unit 11 is performing the firmware update. Therefore, for the power source 2 and the first controlled chip C1, the chip enabling and power enabling signals continue even during the course of the performance of the processing unit 11 updating the firmware, thereby allowing for the operation of the first controlled chip C1 not to be interrupted.

A first end of the two ends of the pull-down resistor Ra electrically connects with the first chip enabling pin P12 and the second chip enabling pin P22, and a second end of the two ends of the pull-down resistor Ra is grounded. With the pull-down resistor Ra, elements' connected to the first end (for example, the first controlled chip C1) may be protected from current spike.

The power source 2 may be configured to receive the first power enabling signal from the processing unit 11 or the second power enabling signal from the expansion I/O chip 12 to supply power to the first controlled chip C1. In addition, the embodiment shown in FIG. 1 may further include another pull-down resistor Rc, with one end of the pull-down resistor Rc electrically connecting with the first power enabling pin P11 and the second power enabling pin P21. Another end of that pull-down resistor might be grounded. With the pull-down resistor Rc, the power source 2 may be protected from the current spike. The first controlled chip C1 may be configured to be powered by the power source 2, and receive the chip enabling signals from the processing unit 11 or the expansion I/O chip 12. The first controlled chip C1 electrically connects with the first end of the pull-down resistor Ra.

Figure 2:
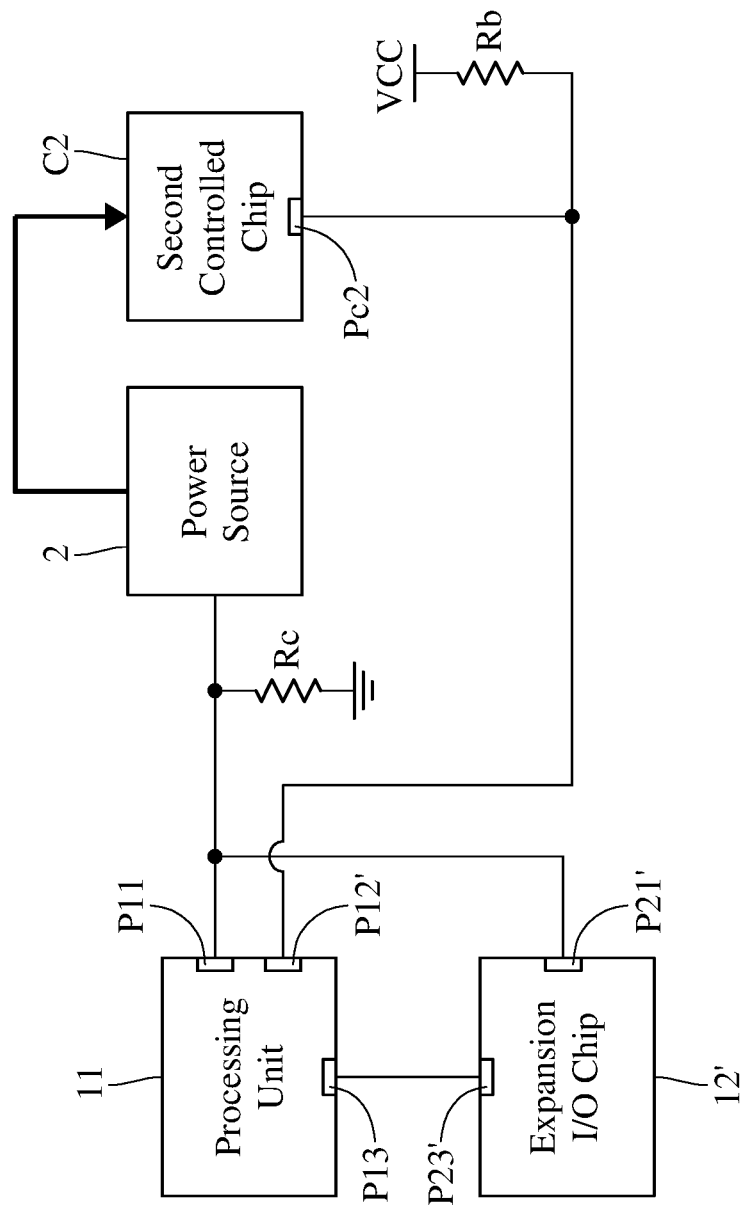
FIG. 2 is a block diagram of an online software upgrade device for keeping operation uninterrupted of a second embodiment of the present disclosure.

Please refer to FIG. 2. The present disclosure further provides an online software upgrade device for maintaining operation uninterrupted of a second embodiment, and the online software upgrade device may include a processing unit 11, an expansion I/O chip 12', and a pull-up resistor Rb. FIG. 2 further illustrates a power source 2 and a second controlled chip C1. The processing unit 11 has a first power enabling pin P11, a first chip enabling pin P12 and a controlling pin P13. The first power enabling pin P11 is configured to output a first power enabling signal, the first chip enabling pin P12 is configured to output a first chip enabling signal, and the controlling pin P13 is configured to output an operation signal. The first chip enabling pin P12 is configured to electrically connect with the driving pin Pc2 of the second controlled chip C2, the first power enabling pin P11 is configured to electrically connect with the power source 2 supplying power to the second controlled chip C2. The expansion I/O chip 12' has a second power enabling pin P21' and a controlled pin P23', the second power enabling pin P21' electrically connects with the first power enabling pin P11 and is configured to output the second power enabling signal, and the controlled pin P23' electrically connects with the controlling pin P13 to receive the operation signal. In the second embodiment of the present disclosure, the controlled pin P23' and the controlling pin P13 may also electrically connect with to each other through an inter integrated circuit (I2C) bus. The connections between elements shown in FIG. 2 are similar to that of the first embodiment, the difference between FIG. 2 and FIG. 1 is the expansion I/O chip 12' and second controlled chip C2 not directly connected to each other in FIG. 2.

The second controlled chip C2 may electrically connect with the power source 2 in order to be powered, and electrically connect with the first chip enabling pin P12 of the processing unit 11 to receive chip enabling signal. Comparing to the first controlled chip C1 of the first embodiment, the power consumption of the second controlled chip C2 of the second embodiment is lower, therefore limiting the current spike in connection with chips having higher power consumption. The online software upgrade device for maintaining operation uninterrupted of the second embodiment may further include a pull-up resistor Rb, with a first end of the pull-up resistor Rb electrically connecting with the first chip enabling pin P12, and a second end of the pull-up resistor Rb electrically connecting with a power supply end VCC. With the pull-up resistor Rb, the second controlled chip C2 may still be connected to the power supply end VCC and remain in the high-level state even if the electrical signal level of the first enabling pin is changed due to the reset process performed by the processing unit 11.

Figure 3:
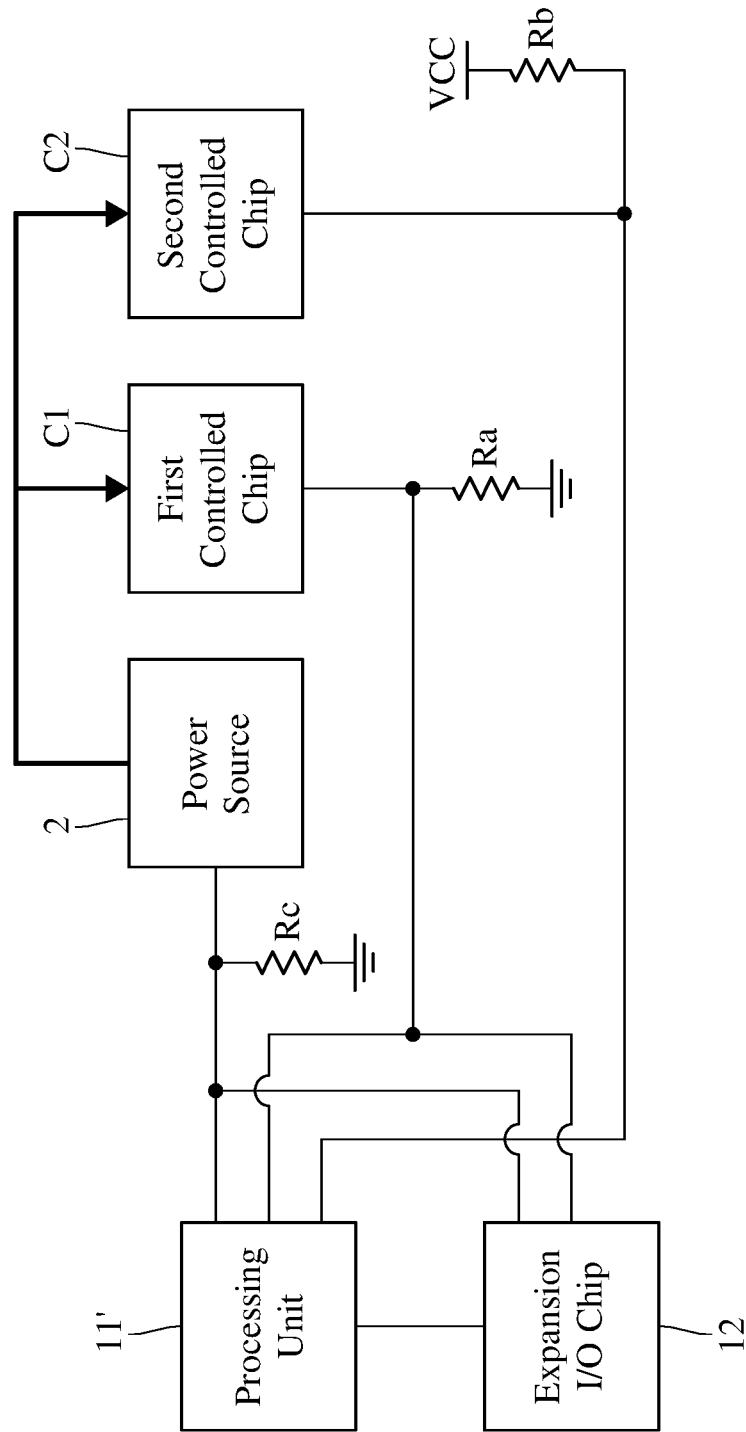
FIG. 3 is a block diagram of an online software upgrade device for keeping operation uninterrupted of a third embodiment of the present disclosure.

The above describes the present disclosure through the first controlled chip C1 of the first embodiment and the second controlled chip C2 of the second embodiment. As shown in FIG. 3, the online software upgrade device for maintaining operation uninterrupted of a third embodiment of the present disclosure may include the first controlled chip C1 and the second controlled chip C2, both of which operate as described above. Further, the embodiment in FIG. 3 may be with the first controlled chip C1 with higher power consumption and the second controlled chip C2 with lower power consumption. In practice, the online software upgrade device for maintaining operation uninterrupted may further comprise various chips with different power consumptions in the scope of the present application.

The above description of the device of the present disclosure explains the expansion I/O chip 12 may temporarily replace the processing unit 11 for at least a part of the operation when the processing unit 11 is performing the reset process. The following description of FIGS. 4 and 5 show an embodiment of an online software upgrade method for maintaining operation uninterrupted of the present disclosure.

Figure 4:
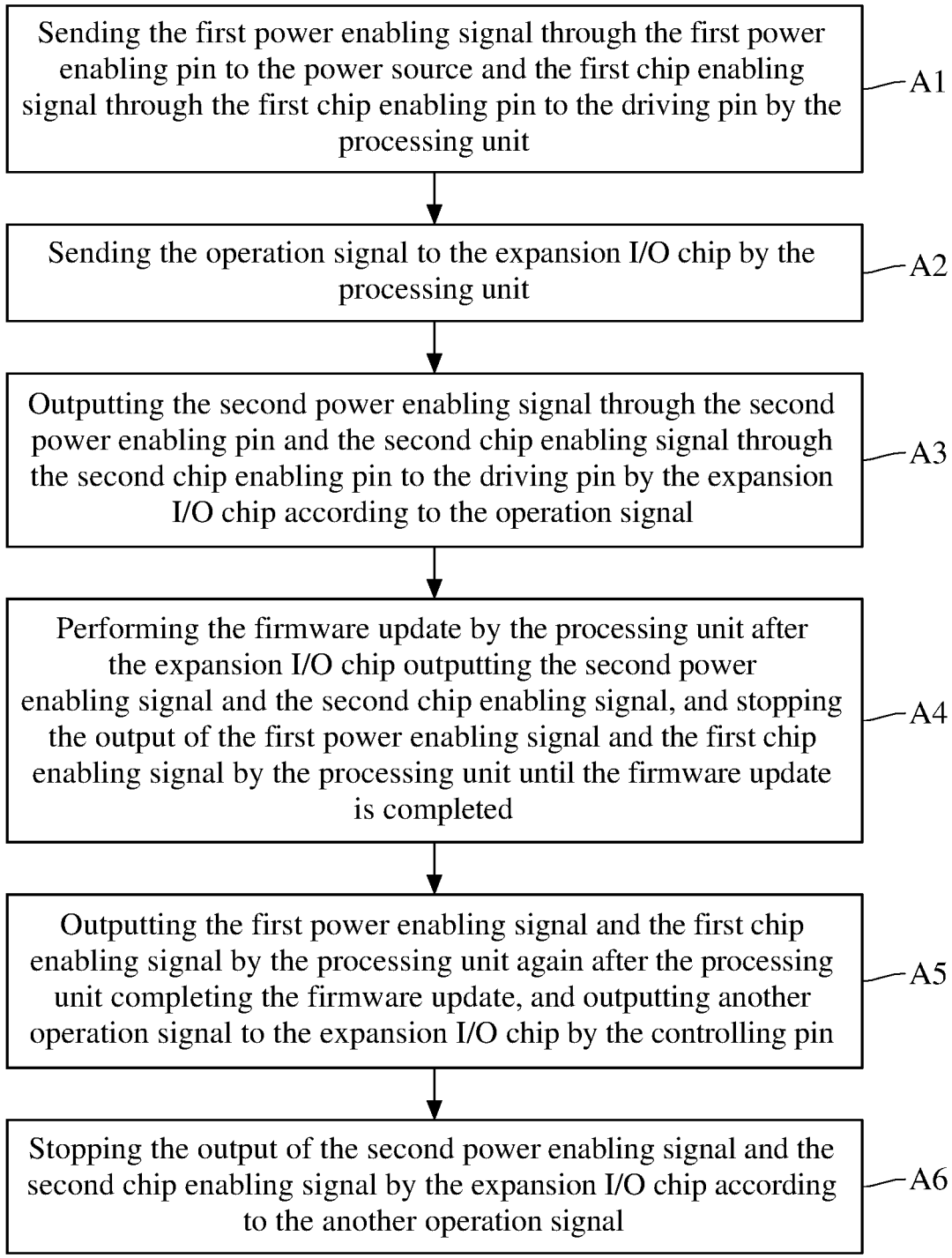
FIG. 4 is a flow chart of an online software upgrade method for keeping operation uninterrupted of the first embodiment of the present disclosure.
Figure 5:
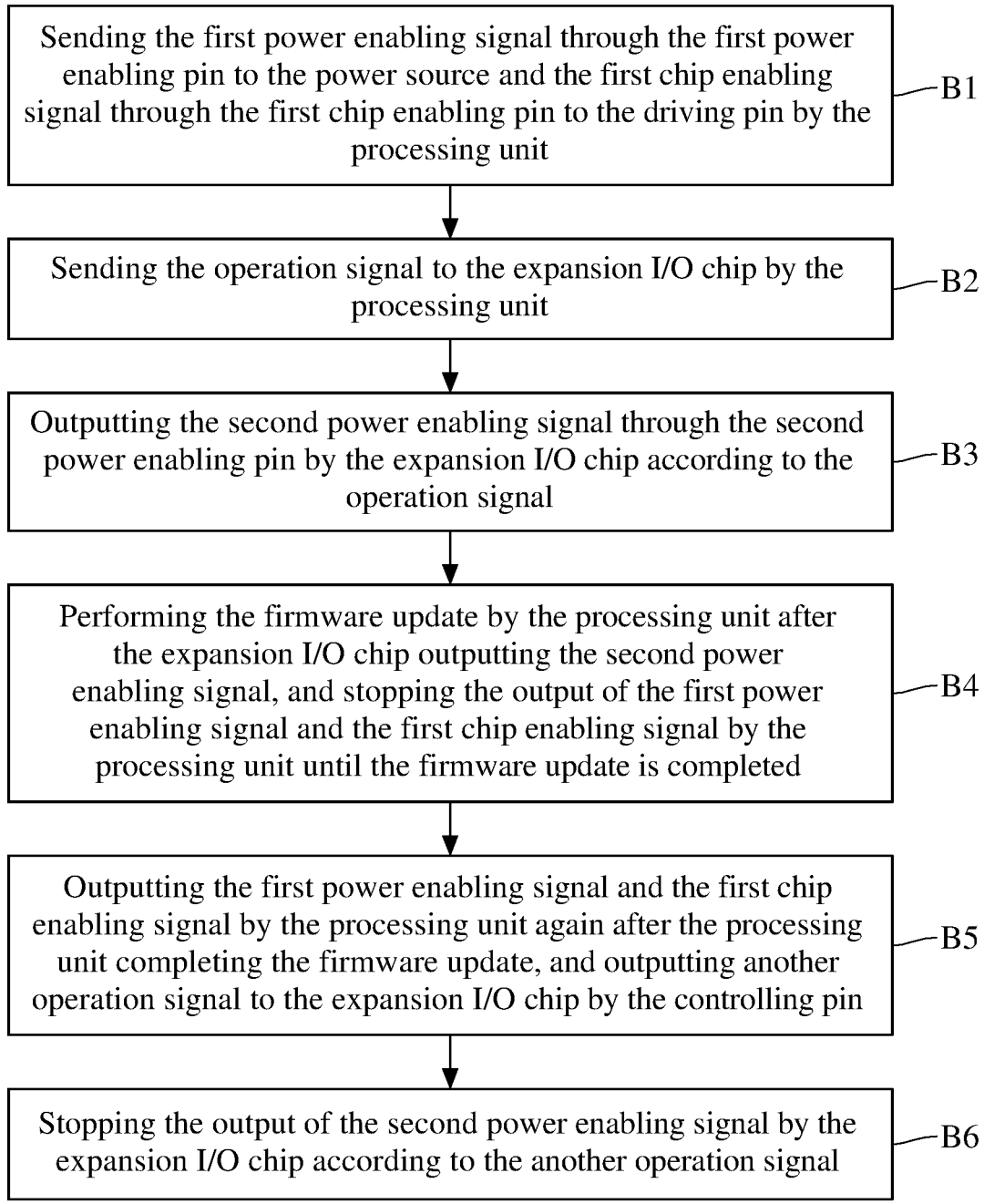
FIG. 5 is a flow chart of an online software upgrade method for keeping operation uninterrupted of the second embodiment of the present disclosure.

Please refer to FIG. 4, the first embodiment of the online software upgrade method for maintaining operation uninterrupted of the present disclosure is adapted to the online software upgrade device of the first embodiment of the present disclosure.

Please refer to step A1, step A1 is sending the first power enabling signal through the first power enabling pin P11 to the power source 2 and the first chip enabling signal through the first chip enabling pin P12 to the driving pin Pc1 by the processing unit 11. This is the default normal operation of the processing unit 11. After the power source 2 receives the power enabling signal from the processing unit 11, the power source 2 supply power to the first controlled chip C1, allowing for the first controlled chip C1 to operate normally because of being powered along with receipt of the first chip enabling signal.

Please refer to step A2, step A2 is sending the operation signal (or the first operation signal) to the expansion I/O chip 12 by the processing unit 11. Since the processing unit 11 resets its first chip and power enabling pins P11 and P12 when performing the firmware update, the first operation signal is first sent to the expansion I/O chip 12 in step A2 to make sure the enabling pins P21 and P22 of the expansion I/O chip 12 could output the enabling signals when the enabling pins P11 and P12 of the processing unit 11 are in the reset process.

Please refer to step A3, step A3 is outputting the second power enabling signal through the second power enabling pin P21 and the second chip enabling signal through the second chip enabling pin P22 to the driving pin Pc1 by the expansion I/O chip 12 according to the operation signal.

Please refer to step A4, step A4 is performing the firmware update by the processing unit 11, and stopping the output of the first power enabling signal and the first chip enabling signal until the firmware update is completed. At this time, the enabling pins P11 and P12 of the processing unit 11 are reset, and the second power and chip enabling pins P21 and P22 of the expansion I/O chip 12 may still cause the first controlled chip C1 to operate normally with the power enabling signal and the chip enabling signal.

Please refer to step A5, step A5 is again outputting the first power enabling signal and the first chip enabling signal by the processing unit 11 after the processing unit 11 completing the firmware update, and outputting another operation signal (or the second operation signal) to the expansion I/O chip 12 by the controlling pin P13. This particular operation signal is different from the operation signal of step A2. If the first operation signal of step A2 changes the default open-drain states of the second power and chip enabling pins P21 and P22 of the expansion I/O chip 12, the second operation signal of step A5 would change back. In short, if the first operation signal of step A2 changes the electrical signal levels from the open-drain state to the high-level state the second operation signal of step A5 would return the electrical signal levels to their open-drain state Step A6 is stopping the output of the second power enabling signal and the second chip enabling signal by the expansion I/O chip 12 according to the second operation signal, at which point the disclosed method (or the firmware update flow) might conclude. If the processing unit 11 needs to perform another update, the upgrade method of the present application may be repeated to maintain the operation uninterrupted.

Please refer to FIG. 5, which is another online software upgrade method for maintaining operation uninterrupted of the second embodiment, and is adapted to the online software upgrade device of the second embodiment in which the second controlled chip C2 with lower power consumption is incorporated. The method includes steps B1~B6. Step B1 is: sending the first power enabling signal through the first power enabling pin P11 to the power source 2 and the first chip enabling signal through the first chip enabling pin P12 to the driving pin Pc1 by the processing unit 11. Step B2 is: sending the first operation signal to the expansion I/O chip 12' by the processing unit 11. Step B3 is: outputting the second power enabling signal through the second power enabling pin P21' by the expansion I/O chip 12' according to the first operation signal. Step B4 is: performing the firmware update by the processing unit 11 after the expansion I/O chip 12' outputting the second power enabling signal, and stopping the output of the first power enabling signal and the first chip enabling signal until the firmware update is completed. Step B5 is: again outputting the first power enabling signal and the first chip enabling signal by the processing unit 11 after the processing unit 11 completing the firmware update, and outputting another (or the second) operation signal to the expansion I/O chip 12' by the controlling pin P13. Step B6 is: stopping the output of the second power enabling signal by the expansion I/O chip 12' according to the second operation signal.

The methods shown in FIGS. 4 and 5 are similar to each other. The difference between FIGS. 4 and 5 is the expansion I/O chip 12' only sends the power enabling signal to the power source in step B3 when the second power enabling pin P21' is in the high-level state. When the first power and chip enabling pins of the processing unit 11 are, for example, in the reset state, the driving pin Pc2 of the second controlled chip C2 operates normally through the pull-up resistor Rb that is in its high-level state when receiving voltages from the power supply end VCC.

In addition, the present disclosure also provides another embodiment of facilitating online software upgrade method for maintaining operation uninterrupted. Since the device used in this embodiment is the combination of the first and second embodiments, a person skilled in the art should have no trouble understanding the flow of the disclosed embodiment using such update device.

In view of the above description, in an embodiment of the present disclosure, the expansion I/O chip receiving the operation signal may at least output the power enabling signal or even output the chip enabling signal for the controlled chip to operate normally when the processing unit stops outputting the power enabling signal and the chip enabling signal due to the firmware update. With the online software upgrade method for keeping operation uninterrupted of the present disclosure, the operation (for example, communication operation) of the chip may be uninterrupted (for example, avoiding the upload or download of important data being interrupted, or avoiding the delay of displayed images, etc.) even when a user upgrades the software of the device at the same time.

What is claimed is:

1. An online software upgrade device for maintaining operation uninterrupted comprising:
   a processing unit, having a first power enabling pin, a first chip enabling pin and a controlling pin, with the first power enabling pin configured to output a first power enabling signal, the first chip enabling pin configured to output a first chip enabling signal, and the controlling pin configured to output an operation signal, wherein the first chip enabling pin is configured to electrically connect with a driving pin of a controlled chip, and the first power enabling pin is configured to electrically connect with a power source supplying power to the controlled chip;
   an expansion input/output (I/O) chip, having a second power enabling pin, a second chip enabling pin and a controlled pin, with the second power enabling pin electrically connecting with the first power enabling pin and configured to output a second power enabling signal, the second chip enabling pin electrically connecting with the first chip enabling pin and configured to output a second chip enabling signal, and the controlled pin electrically connecting with the controlling pin to receive the operation signal; and
   a pull-down resistor, having a first end electrically connecting with the first chip enabling pin and the second chip enabling pin, and the pull-down resistor further having a second end being grounded.

2. The online software upgrade device for maintaining operation uninterrupted according to claim 1, further comprising another pull-down resistor, with an end of the another pull-down resistor electrically connecting with the first power enabling pin and the second power enabling pin, and another end of the another pull-down resistor being grounded.

3. The online software upgrade device for maintaining operation uninterrupted according to claim 1, wherein the controlling pin electrically connects with the controlled pin through an inter integrated circuit (I2C) bus.

4. An online software upgrade device for maintaining operation uninterrupted comprising:
   a processing unit, having a first power enabling pin, a first chip enabling pin and a controlling pin, with the first power enabling pin configured to output a first power enabling signal, the first chip enabling pin configured to output a first chip enabling signal, and the controlling pin configured to output an operation signal, wherein the first chip enabling pin is configured to electrically connect with a driving pin of a controlled chip, and the first power enabling pin is configured to electrically connect with a power source supplying power to the controlled chip;
   an expansion input/output (I/O) chip, having a second power enabling pin and a controlled pin, with the second power enabling pin electrically connecting with the first power enabling pin and configured to output a second power enabling signal, and the controlled pin electrically connecting with the controlling pin to receive the operation signal; and
   a pull-up resistor, having a first end electrically connecting with the first chip enabling pin, and the pull-up resistor further having a second end being grounded.

5. The online software upgrade device for maintaining operation uninterrupted according to claim 4, further comprising a pull-down resistor, with an end of the pull-down resistor electrically connecting with the first power enabling pin and the second power enabling pin, and another end of the pull-down resistor being grounded.

6. The online software upgrade device for maintaining operation uninterrupted according to claim 4, wherein the controlling pin electrically connects with the controlled pin through an inter integrated circuit (I2C) bus.

7. An online software upgrade method for maintaining operation uninterrupted, adapted to the online software upgrade device of claim 1, comprising:
   by the processing unit, sending the first power enabling signal through the first power enabling pin to the power source, and sending the first chip enabling signal through the first chip enabling pin to the driving pin;
   sending, by the processing unit, a first operation signal to the expansion I/O chip;
   by the expansion I/O chip, outputting the second power enabling signal through the second power enabling pin according to the first operation signal, and outputting the second chip enabling signal through the second chip enabling pin;
   performing, by the processing unit, a firmware update after the expansion I/O chip outputs the second power enabling signal and the second chip enabling signal, and stopping the output of the first power enabling signal and the first chip enabling signal until the firmware update is completed;
   outputting, by the processing unit, the first power enabling signal and the first chip enabling signal again after the processing unit completing the firmware update, and outputting a second operation signal through the controlling pin to the expansion I/O chip; and
   stopping, by the expansion I/O chip, the output of the second power enabling signal and the second chip enabling signal according to the second operation signal.

8. An online software upgrade method for maintaining operation uninterrupted, adapted to the online software upgrade device of claim 4, comprising:
- by the processing unit, sending the first power enabling signal through the first power enabling pin to the power source, and sending the first chip enabling signal through the first chip enabling pin to the driving pin;
- sending, by the processing unit, a first operation signal to the expansion I/O chip;
- sending, by the expansion I/O chip, the second power enabling signal through the second power enabling pin according to the first operation signal;
- by the processing unit, performing a firmware update after the expansion I/O chip outputs the second power enabling signal, and stopping the output of the first power enabling signal and the first chip enabling signal until the firmware update is completed;
- by the processing unit, outputting the first power enabling signal and the first chip enabling signal again after the processing unit completes the firmware update, and outputting another operation signal through the controlling pin to the expansion I/O chip; and stopping, by the expansion I/O chip, the output of the second power enabling signal according to a second operation signal.

* * * * *